(12) United States Patent
Mishima et al.

(10) Patent No.: US 12,638,612 B2
(45) Date of Patent: May 26, 2026

(54) OPTICAL FIBER SENSING SYSTEM, OPTICAL FIBER SENSING METHOD, AND VIBRATION DEVICE

(71) Applicant: NEC Corporation, Tokyo (JP)

(72) Inventors: Sakiko Mishima, Tokyo (JP); Takashi Matsushita, Tokyo (JP); Wataru Kohno, Tokyo (JP); Tomoyuki Hino, Tokyo (JP)

(73) Assignee: NEC CORPORATION, Tokyo (JP)

( * ) Notice: Subject to any disclaimer, the term of this patent is extended or adjusted under 35 U.S.C. 154(b) by 373 days.

(21) Appl. No.: 18/526,798

(22) Filed: Dec. 1, 2023

(65) Prior Publication Data

US 2024/0184014 A1 Jun. 6, 2024

(30) Foreign Application Priority Data

Dec. 6, 2022 (JP) ................................. 2022-194594

(51) Int. Cl.
*G01W 1/14* (2006.01)
*G01D 5/353* (2006.01)
*G01H 9/00* (2006.01)

(52) U.S. Cl.
CPC .......... *G01W 1/14* (2013.01); *G01D 5/35358* (2013.01); *G01H 9/004* (2013.01)

(58) Field of Classification Search
CPC .... G01D 11/30; G01D 11/245; G01D 5/3473; G01D 5/34776; G01D 5/268; G01D 15/24; G01D 5/147; G01D 5/24; G01D 5/2405; G01D 5/243; G01D 9/005; G01D 9/28; G01D 21/02; G01D 3/10; G01D 5/35316; G01D 5/35358; G01D 5/35361;

G01W 1/14; G01W 1/00; G01W 1/08; G01W 1/16; G01W 1/10; G01W 1/02; G01W 1/04; G01W 1/06; G01W 2001/003; G01W 1/12; G01W 1/17; G01W 1/18; G01W 2001/006; G01W 2203/00; G01W 2201/00; G02B 2027/0118; G02B 2027/012; G02B 6/00; G02B 7/021; G02B 7/10; G02B 7/182
(Continued)

(56) References Cited

U.S. PATENT DOCUMENTS 12,025,488 B2 * 7/2024 Hu ........................... G01L 1/242
2019/0025095 A1 * 1/2019 Steel ...................... G01K 11/32
(Continued)

FOREIGN PATENT DOCUMENTS

CN 111189485 A * 5/2020 ............. G01D 21/02
WO WO-2018022532 A1 * 2/2018 ............. E21B 47/06
(Continued)

*Primary Examiner* — Andre J Allen
(74) *Attorney, Agent, or Firm* — Sughrue Mion, PLLC

(57) ABSTRACT

An optical fiber sensing system according to the present disclosure includes an optical fiber, an interrogator connected to the optical fiber, and a vibration device disposed in a vicinity of the optical fiber. The vibration device acquires weather information regarding an installation location of the vibration device, and applies vibration according to the acquired weather information to the optical fiber. The interrogator detects vibration applied to the optical fiber by the vibration device, based on an optical signal received from the optical fiber, and determines weather conditions at the installation location of the vibration device, based on the detected vibration.

15 Claims, 6 Drawing Sheets

(58) Field of Classification Search
USPC .......................................... 73/170.16–170.28
See application file for complete search history.

(56)                        References Cited

U.S. PATENT DOCUMENTS

2023/0129510 A1 *    4/2023   Ding ...................... G01H 9/004
                                                            73/170.17
2023/0152486 A1 *    5/2023   Ulmer ..................... G01W 1/11

FOREIGN PATENT DOCUMENTS

WO          2021/111691  A1      6/2021
WO       WO-2022149199  A1 *   7/2022    ........ G01M 11/3154
WO       WO-2023181184  A1 *   9/2023    .............. G01W 1/10

* cited by examiner

30
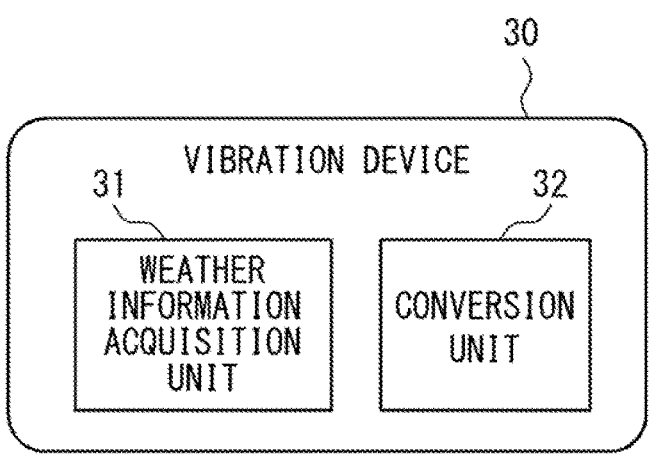
Fig. 2
| | DISTANCE OF OPTICAL FIBER 10 | LATITUDE AND LONGITUDE |
|---|---|---|
| VIBRATION DEVICE 30-1 | a[m] | x1, y1 |
| VIBRATION DEVICE 30-2 | b[m] | x2, y2 |
| ⋮ | ⋮ | ⋮ |
Fig. 3
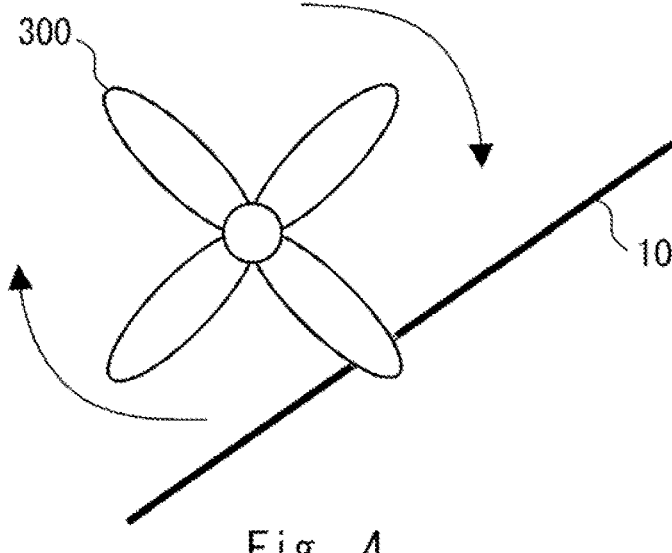
Fig. 4

1

OPTICAL FIBER SENSING SYSTEM, OPTICAL FIBER SENSING METHOD, AND VIBRATION DEVICE

INCORPORATION BY REFERENCE

This application is based upon and claims the benefit of priority from Japanese patent application No. 2022-194594, filed on Dec. 6, 2022, the disclosure of which is incorporated herein in its entirety by reference.

TECHNICAL FIELD

The present disclosure relates to an optical fiber sensing system, an optical fiber sensing method, and a vibration device.

BACKGROUND ART

In recent years, it is possible to detect vibration and sound applied to an optical fiber at each point along an optical fiber by using a technique called optical fiber sensing (International Patent Publication No. WO2021/111691).

For example, in optical fiber sensing using distributed acoustic sensing (DAS), an interrogator connected to an optical fiber inputs pulsed light into the optical fiber and receives backscattered light of the pulsed light from the optical fiber.

When vibration or sound is applied to the optical fiber, characteristics (e.g., phase) of the backscattered light transmitted through the optical fiber change. Therefore, the interrogator is able to detect the vibration or the sound applied to the optical fiber by analyzing the backscattered light.

As described above, the interrogator is able to detect the vibration applied to the optical fiber, based on the backscattered light received from the optical fiber.

Therefore, when the vibration applied to the optical fiber is vibration related to weather conditions around the optical fiber, the interrogator can determine the weather conditions around the optical fiber, based on the backscattered light received from the optical fiber.

SUMMARY

Therefore, in view of the above-described issue, an example object of the present disclosure is to provide an optical fiber sensing system, an optical fiber sensing method, and a vibration device that can contribute to determination of weather conditions at an interrogator.

In a first example aspect, an optical fiber sensing system includes:

an optical fiber;

an interrogator connected to the optical fiber: and a vibration device disposed in a vicinity of the optical fiber, wherein the vibration device acquires weather information regarding an installation location of the vibration device, and applies vibration according to the acquired weather information to the optical fiber, and the interrogator detects vibration applied to the optical fiber by the vibration device, based on an optical signal received from the optical fiber, and determines weather conditions at the installation location of the vibration device, based on the detected vibration.

2

In a second example aspect, an optical fiber sensing method is performed by an optical fiber sensing system, the optical fiber sensing system including:

an optical fiber;

an interrogator connected to the optical fiber; and a vibration device disposed in a vicinity of the optical fiber, the optical fiber sensing method including:

a first step of, by the vibration device, acquiring weather information regarding an installation location of the vibration device and applying vibration according to the acquired weather information to the optical fiber: and a second step of, by the interrogator, detecting vibration applied to the optical fiber by the vibration device, based on an optical signal received from the optical fiber, and determining weather conditions at the installation location of the vibration device, based on the detected vibration.

In a third example aspect, a vibration device is disposed in a vicinity of an optical fiber and performs:

acquiring weather information regarding an installation location of the vibration device; and applying vibration according to the weather information to the optical fiber.

BRIEF DESCRIPTION OF DRAWINGS

The above and other aspects, features, and advantages of the present disclosure will become more apparent from the following description of certain example embodiments when taken in conjunction with the accompanying drawings, in which:

FIG. 2 is a diagram illustrating a configuration example of a vibration device according to the first example embodiment;

FIG. 3 is a diagram illustrating an example of a correspondence table according to the first example embodiment;

FIG. 4 is a diagram illustrating a specific configuration example 1 of a weather information acquisition unit and a conversion unit according to the first example embodiment;

EXAMPLE EMBODIMENT

Hereinafter, example embodiments of the present disclosure will be described with reference to the drawings. Note that the following description and the drawings are omitted and simplified as appropriate for clarity of description. In the following drawings, the same elements are denoted by the same reference signs, and redundant descriptions are omitted as necessary.

First Example Embodiment

Figure 1:
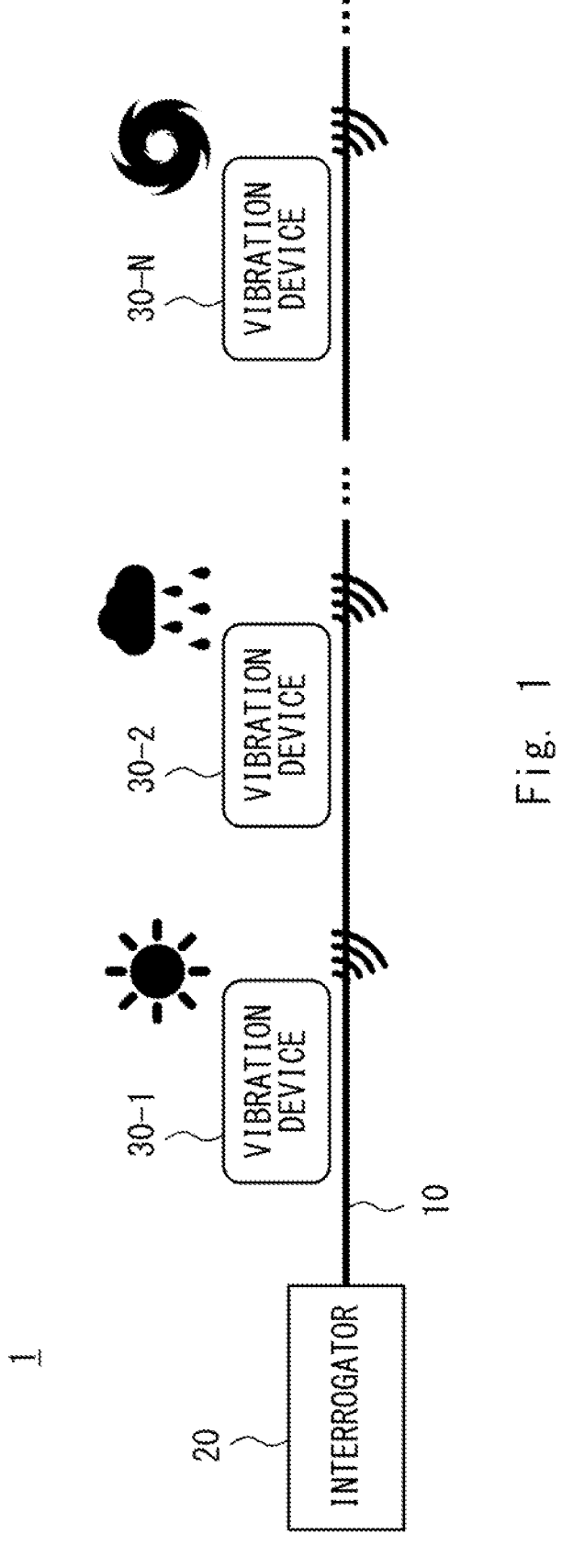
FIG. 1 is diagram illustrating a configuration example of an optical fiber sensing system according to a first example embodiment.

FIG. 1 is a diagram illustrating a configuration example of an optical fiber sensing system 1 according to a first example embodiment. As illustrated in FIG. 1, the optical fiber sensing system 1 according to the first example embodiment includes an optical fiber 10, an interrogator 20, and N vibration devices 30-1 to 30-N.

Hereinafter, the vibration devices 30-1 to 30-N are simply referred to as [vibration device 30] when they are not identified from one another. Further, FIG. 1 illustrates an example in which a plurality of vibration devices 30 are provided, but the present description is not limited thereto, and a single vibration device 30 may be provided. That is, N may be 1 or more.

The optical fiber 10 is laid, for example, in an overhead manner between columns such as utility poles, steel towers, and the like. Further, the optical fiber 10 may be laid in the form of an optical fiber cable (not illustrated) configured by covering the optical fiber 10.

The vibration device 30 is disposed in the vicinity of the optical fiber 10. For example, in a case where the optical fiber 10 is laid in an overhead manner between columns, the vibration device 30 may be attached to a column.

Herein, the vicinity of the optical fiber 10 is, for example, within a certain distance from the optical fiber 10. The certain distance is, for example, a distance at which the vibration device 30 is able to apply mechanical vibration to the optical fiber 10, as will be described later.

FIG. 2 is a diagram illustrating a configuration example of the vibration device 30 according to the first example embodiment. As illustrated in FIG. 2, the vibration device 30 according to the first example embodiment includes a weather information acquisition unit 31 and a conversion unit 32.

The weather information acquisition unit 31 acquires weather information regarding an installation location of the vibration device 30.

The conversion unit 32 applies mechanical vibration according to the weather information acquired by the weather information acquisition unit 31 to the optical fiber 10.

Herein, the weather information acquisition unit 31 and the conversion unit 32 perform the above-described operations in a state where there is no power supply from the outside (e.g., power supply by a commercial power supply) to the vibration device 30. A specific configuration example of the weather information acquisition unit 31 and the conversion unit 32 will be described later.

The interrogator 20 is connected to one end of the optical fiber 10. For example, the interrogator 20 is a DAS interrogator using DAS.

The interrogator 20 transmits pulsed light to the optical fiber 10. Then, as the pulsed light is transmitted through the optical fiber 10, backscattered light is generated. The interrogator 20 receives the backscattered light from the optical fiber 10 as an optical signal.

Herein, when mechanical vibration is applied to the optical fiber 10 by the conversion unit 32 of the vibration device 30, a characteristic (e.g., a wavelength) of the optical signal transmitted through the optical fiber 10 changes. Therefore, the interrogator 20 is able to detect the vibration applied to the optical fiber 10 by analyzing the optical signal received from the optical fiber 10.

Further, the interrogator 20 is able to identify the position at which the optical signal is generated (the distance of the optical fiber 10 from the interrogator 20), based on the time difference between the time at which the pulsed light is transmitted to the optical fiber 10 and the time at which the optical signal is received from the optical fiber 10.

Therefore, when the vibration is detected by analyzing the optical signal, the interrogator 20 is able to identify the position where the optical signal is generated as the position where the vibration is generated.

Further, the interrogator 20 is able to identify a vibration device 30 in which the vibration is generated and the latitude and longitude of the installation location of such vibration device 30 by comparing the position where the vibration is generated with a correspondence table as illustrated in FIG. 3. Note that the correspondence table illustrated in FIG. 3 may be stored in advance in a memory (not illustrated) or the like.

Herein, the vibration applied to the optical fiber 10 by the conversion unit 32 of the vibration device 30 is vibration according to the weather information regarding the installation location of the vibration device 30, as described above.

Therefore, the interrogator 20 can determine the weather conditions at the installation location of the vibration device 30, based on the vibration applied to the optical fiber 10 by the conversion unit 32 of the vibration device 30. Specifically, the interrogator 20 determines the weather conditions at the installation location of the vibration device 30, based on at least one of the frequency and intensity of the vibration applied to the optical fiber 10.

Hereinafter, a specific configuration of the weather information acquisition unit 31 and the conversion unit 32 in the vibration device 30 will be described.

(1) Configuration Example 1

FIG. 4 is a diagram illustrating a specific configuration example 1 of the weather information acquisition unit 31 and the conversion unit 32 according to the first example embodiment. In the configuration example 1, the weather information acquisition unit 31 and the conversion unit 32 are achieved by a propeller 300.

The propeller 300 is disposed in the vicinity of the optical fiber 10.

A blade portion of the propeller 300 rotates when being hit by a wind, and hits the optical fiber 10. As a result, mechanical vibration is applied to the optical fiber 10.

Herein, the frequency of the vibration applied to the optical fiber 10 by the propeller 300 is a frequency according to the wind force at the installation location of the vibration device 30 (the propeller 300). That is, if the wind force is strong, the frequency of vibration increases.

Therefore, the interrogator 20 calculates the frequency of the vibration applied to the optical fiber 10, based on the optical signal received from the optical fiber 10. Then, the interrogator 20 determines the wind force at the installation location of the vibration device 30, based on the calculated frequency of vibration.

(2) Configuration Example 2

Figure 5:
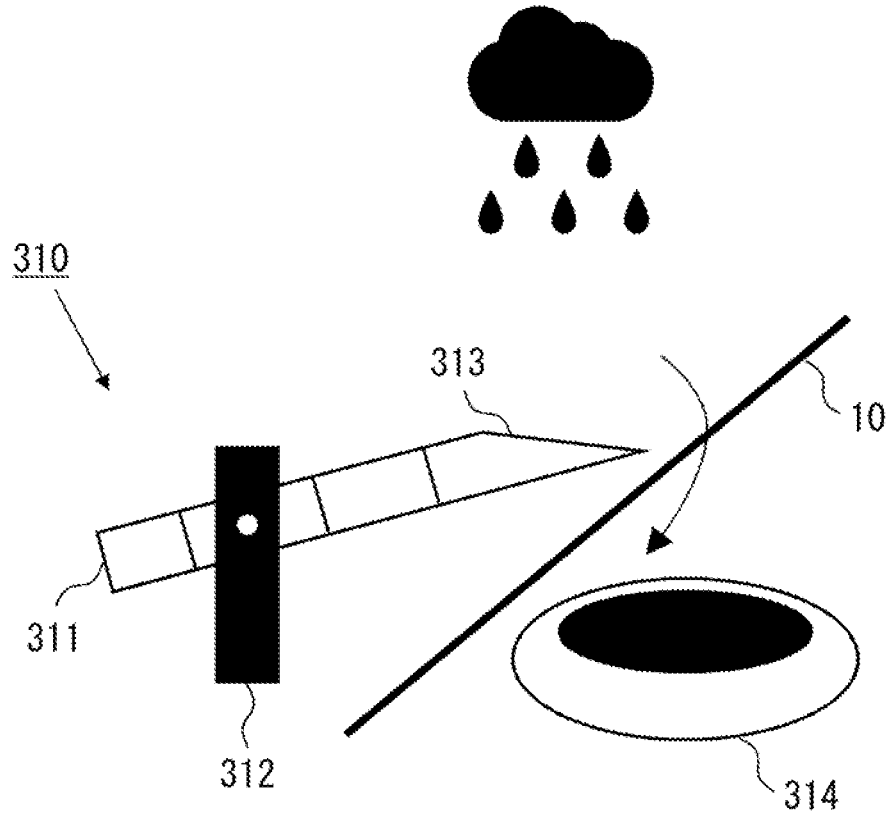
FIG. 5 is a diagram illustrating a specific configuration example 2 of the weather information acquisition unit and the conversion unit according to the first example embodiment.

FIG. 5 is a diagram illustrating a specific configuration example 2 of the weather information acquisition unit 31 and the conversion unit 32 according to the first example embodiment. In the configuration example 2, the weather information acquisition unit 31 and the conversion unit 32 are achieved by a shishi-odoshi (literally meaning deer-scarer in Japanese, an apparatus made from bamboo and originally used for scaring away animals) 310.

The shishi-odoshi 310 is disposed in the vicinity of the optical fiber 10.

The shishi-odoshi 310 includes a cylindrical member 311 having an opening 313 at one end thereof and receiving rainwater through the opening 313, and a support member 312 rotatably supporting the cylindrical member 311.

The cylindrical member 311 stores the rainwater received through the opening 313 therein. When rainwater stored in the cylindrical member 311 reaches a predetermined amount, the cylindrical member 311 rotates due to its own weight and hits the optical fiber 10. As a result, mechanical vibration is applied to the optical fiber 10. Note that, the cylindrical member 311 rotates due to its own weight, discharges rainwater from the opening 313 to a discharge container 314, and upon completion of the discharge operation, returns to the original position.

Herein, the frequency of the vibration applied to the optical fiber 10 by the shishi-odoshi 310 is a frequency according to the rainfall amount at the installation location of the vibration device 30 (the shishi-odoshi 310). That is, if the rainfall amount is large, the frequency of vibration increases.

Therefore, the interrogator 20 calculates the frequency of the vibration applied to the optical fiber 10, based on the optical signal received from the optical fiber 10. Then, the interrogator 20 determines the rainfall amount at the installation location of the vibration device 30, based on the calculated frequency of vibration.

(3) Configuration Example 3

Figure 6:
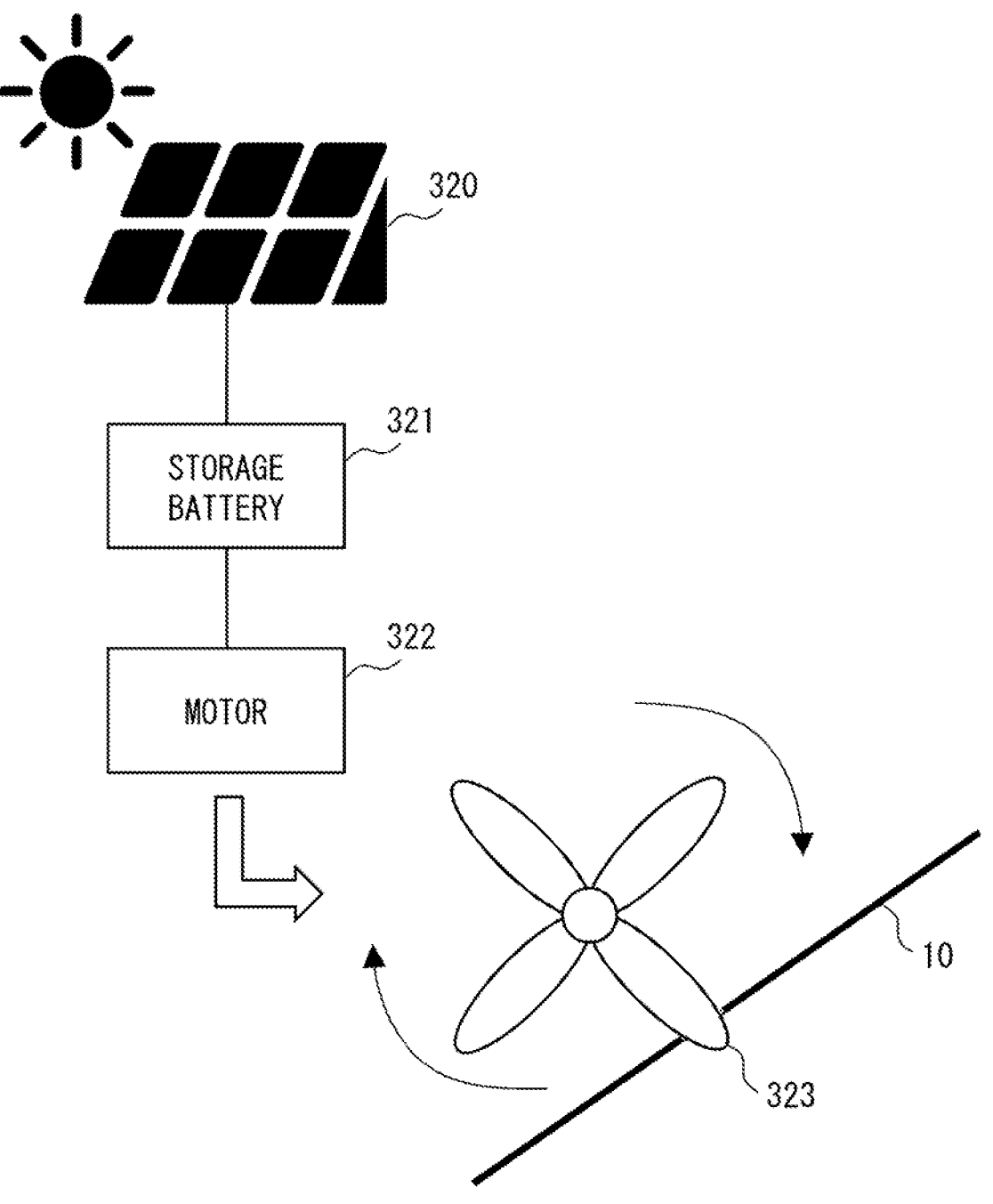
FIG. 6 is a diagram illustrating a specific configuration example 3 of the weather information acquisition unit and the conversion unit according to the first example embodiment.

FIG. 6 is a diagram illustrating a specific configuration example 3 of the weather information acquisition unit 31 and the conversion unit 32 according to the first example embodiment. In the configuration example 3, the weather information acquisition unit 31 is achieved by a solar panel 320, and the conversion unit 32 is achieved by a storage battery 321, a motor 322, and a propeller 323.

The solar panel 320 generates electric power by using sunlight.

The storage battery 321 stores electric power generated by the solar panel 320.

The motor 322 rotationally drives the propeller 323 by using electric power stored in the storage battery 321. The propeller 323 is disposed in the vicinity of the optical fiber 10.

A blade portion of the propeller 323 hits the optical fiber 10 when the propeller 323 is rotationally driven by the motor 322. As a result, mechanical vibration is applied to the optical fiber 10.

Herein, the electric power stored in the storage battery 321 is electric power according to sunshine duration at the installation location of the vibration device 30 (the solar panel 320). Therefore, the frequency and intensity of the vibration applied to the optical fiber 10 by the propeller 323 which is rotationally driven by using the electric power stored in the storage battery 321 become the frequency and intensity according to the sunshine duration at the installation location of the vibration device 30. That is, if the sunshine duration is long, the frequency and intensity of the vibration become large.

Therefore, the interrogator 20 calculates the frequency and intensity of the vibration applied to the optical fiber 10, based on the optical signal received from the optical fiber 10. Then, the interrogator 20 determines the sunshine duration at the installation location of the vibration device 30, based on the calculated frequency and intensity of the vibration.

Figure 7:
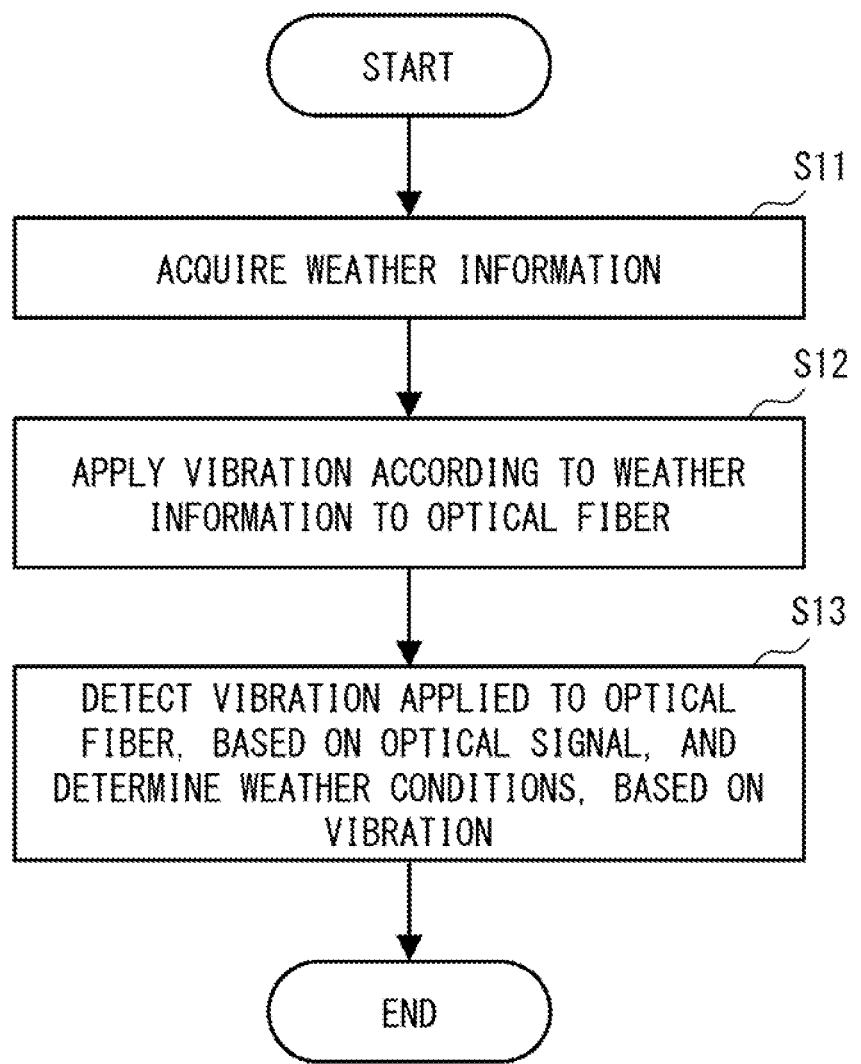
FIG. 7 is a flowchart describing an example of a schematic operation flow of the optical fiber sensing system according to the first example embodiment.

FIG. 7 is a flowchart for describing an example of a schematic operation flow of the optical fiber sensing system 1 according to the first example embodiment.

As illustrated in FIG. 7, first, the weather information acquisition unit 31 acquires weather information regarding an installation location of the vibration device 30 (step S11).

Next, the conversion unit 32 applies mechanical vibration according to the weather information acquired by the weather information acquisition unit 31 to the optical fiber 10 (step S12).

Thereafter, the interrogator 20 detects the vibration applied to the optical fiber 10 by the conversion unit 32 of the vibration device 30, based on the optical signal received from the optical fiber 10, and identifies the vibration device 30 which applied the vibration to the optical fiber 10 and the installation location of the vibration device 30. Then, the interrogator 20 determines the weather conditions at the installation location of the identified vibration device 30, based on the detected vibration (step S13).

As described above, according to the first example embodiment, the weather information acquisition unit 31 acquires weather information regarding the installation location of the vibration device 30. The conversion unit 32 applies mechanical vibration according to the weather information to the optical fiber 10. The interrogator 20 detects the vibration applied to the optical fiber 10 by the conversion unit 32 of the vibration device 30, based on the optical signal received from the optical fiber 10, and determines the weather conditions at the installation location of the vibration device 30, based on the detected vibration. This may contribute to the interrogator 20 determining the weather conditions at the installation location of the vibration device 30.

Further, according to the first example embodiment, the weather information acquisition unit 31 and the conversion unit 32 perform operations in a state where there is no power supply from the outside to the vibration device 30. This eliminates the need for power supply from the outside to the vibration device 30, and thus facilitates maintenance of the vibration device 30. As a result, the weather conditions at the installation location of the vibration device 30 can be determined over a long period of time.

Other Example Embodiment

In the first example embodiment described above, the specific configuration examples 1 to 3 of the weather information acquisition unit 31 and the conversion unit 32 in the vibration device 30 have been described, but the present description is not limited thereto.

For example, in a case where the vibration device 30 uses the solar panel 320 as in the specific configuration example 3, electric power may be stored in the storage battery 321. Therefore, the vibration device 30 may also sense the weather conditions by the sensor by using the electric power stored in the storage battery 321. For example, the vibration device 30 may use the electric power stored in the storage battery 321 to drive an ultrasonic sensor that emits ultrasonic waves, and sense the snowfall amount at the installation location of the vibration device 30. Then, the vibration device 30 may apply mechanical vibration according to the sensed snowfall amount to the optical fiber 10 by using an actuator provided in association with the ultrasonic sensor.

<Hardware Configuration of Interrogator According to Example Embodiment>

Hereinafter, an example of a hardware configuration of a computer that achieves the interrogator 20 according to the first example embodiment described above will be described.

Figure 8:
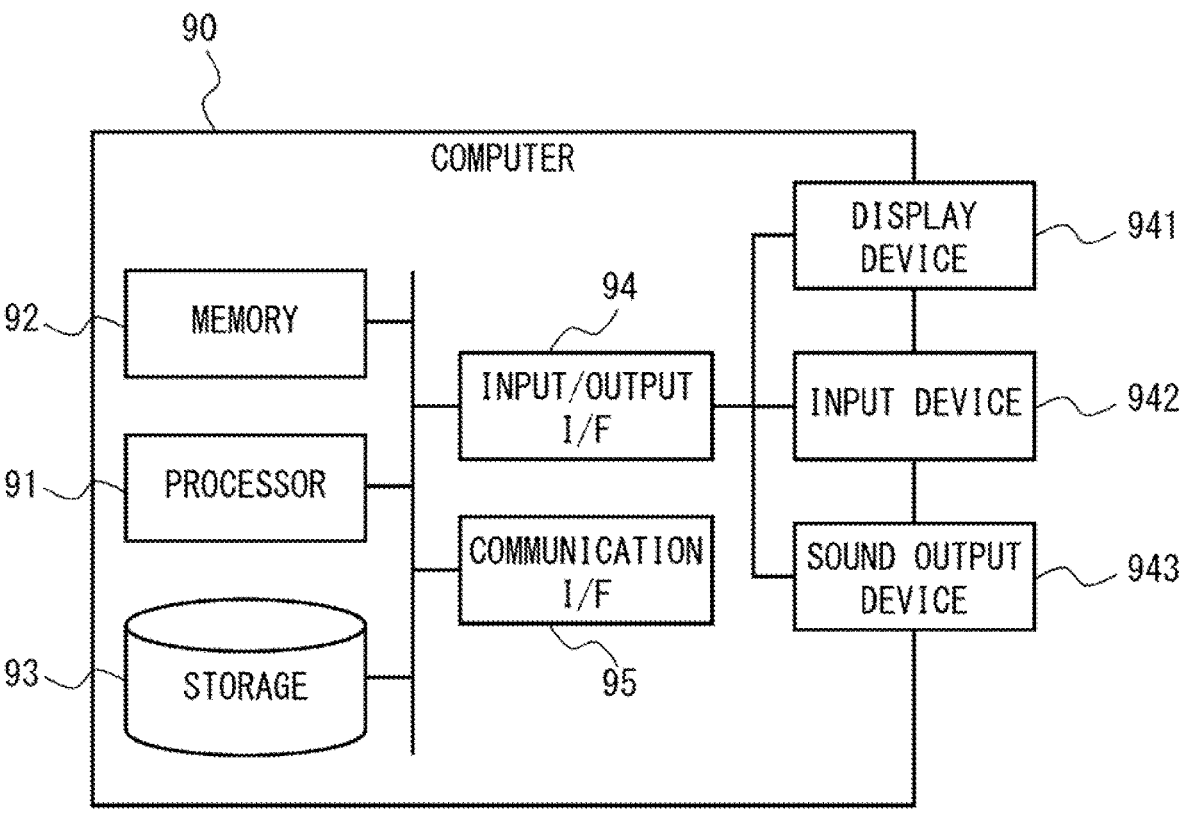
FIG. 8 is a block diagram illustrating an example of a hardware configuration of a computer that achieves an interrogator according to the first example embodiment.

FIG. 8 is a block diagram illustrating an example of a hardware configuration of a computer 90 that achieves the interrogator 20 according to the first example embodiment described above.

As illustrated in FIG. 8, the computer 90 includes a processor 91, a memory 92, a storage 93, an input/output interface (input/output I/F) 94, a communication interface (communication I/F) 95, and the like. The processor 91, the memory 92, the storage 93, the input/output interface 94, and the communication interface 95 are connected by a data transmission path for transmitting and receiving data to and from one another.

The processor 91 is, for example, an arithmetic processor such as a central processing unit (CPU) or a graphics processing unit (GPU). The memory 92 is, for example, a memory such as a random access memory (RAM) or a read only memory (ROM). The storage 93 is, for example, a storage device such as a hard disk drive (HDD), a solid state drive (SSD), or a memory card. The storage 93 may be a memory such as a RAM or a ROM.

A program is stored in the storage 93. The program includes an instruction set (or software code) that, when loaded into a computer, causes the computer 90 to perform one or more of the functions in the interrogator 20 described above. The above-described constituent elements in the interrogator 20 may be achieved by the processor 91 reading and executing a program stored in the storage 93. Further, the above-described storage function of the interrogator 20 may be achieved by the memory 92 or the storage 93.

The above-described program may be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g., magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

The input/output interface 94 is connected to a display device 941, an input device 942, a sound output device 943, and the like. The display device 941 is a device such as a liquid crystal display (LCD), a cathode ray tube (CRT) display, or a monitor that displays a screen corresponding to rendering data processed by the processor 91. The input device 942 is a device that receives an operation input from an operator, and is, for example, a keyboard, a mouse, a touch sensor, or the like. The display device 941 and the input device 942 may be integrated and achieved as a touch panel. The sound output device 943 is a device, such as a speaker, that acoustically outputs a sound corresponding to sound data processed by the processor 91.

The communication interface 95 transmits and receives data to and from an external device. For example, the communication interface 95 communicates with an external device via a wired communication path or a wireless communication path.

Although the present disclosure has been described with reference to the example embodiments, the present disclosure is not limited to the above-described example embodiments. Various changes that can be understood by a person skilled in the art within the scope of the present disclosure can be made to the configuration and details of the present disclosure. For example, some or all of the above-described example embodiments may be used in combination with one another.

The whole or part of the example embodiments disclosed above can be described as, but not limited to, the following supplementary notes.

(Supplementary Note 1)

An optical fiber sensing system including:

an optical fiber;

an interrogator connected to the optical fiber: and a vibration device disposed in a vicinity of the optical fiber, wherein the vibration device acquires weather information regarding an installation location of the vibration device, and applies vibration according to the acquired weather information to the optical fiber, and the interrogator detects vibration applied to the optical fiber by the vibration device, based on an optical signal received from the optical fiber, and determines weather conditions at the installation location of the vibration device, based on the detected vibration.

(Supplementary Note 2)

The optical fiber sensing system according to supplementary note 1, wherein the interrogator determines weather conditions at the installation location of the vibration device, based on at least one of a frequency and intensity of vibration applied to the optical fiber.

(Supplementary Note 3)

The optical fiber sensing system according to supplementary note 2, wherein the vibration device operates in a state in which there is no power supply from outside to the vibration device.

(Supplementary Note 4)

The optical fiber sensing system according to supplementary note 3, wherein the vibration device is a propeller, a blade portion of the propeller rotates when being hit by wind, hits the optical fiber, and thereby applies vibration to the optical fiber, and the interrogator determines wind force at the installation location of the vibration device, based on a frequency of vibration applied to the optical fiber.

(Supplementary Note 5)

The optical fiber sensing system according to supplementary note 3, wherein the vibration device is a shishi-odoshi including a cylindrical member configured to have an opening at one end and receive rainwater through the opening, and a support member configured to rotatably support the cylindrical member, the cylindrical member rotates due to an own weight when rainwater stored in the cylindrical member reaches a predetermined amount, hits the optical fiber, and thereby applies vibration to the optical fiber, and the interrogator determines a rainfall amount at the installation location of the vibration device, based on a frequency of vibration applied to the optical fiber.

(Supplementary Note 6)

The optical fiber sensing system according to supplementary note 3, wherein the vibration device includes a solar panel configured to generate electric power by using sunlight, a storage battery configured to store electric power generated by the solar panel, a propeller, and a motor configured to rotationally drive the propeller by using electric power stored in the storage battery, a blade portion of the propeller hits the optical fiber when the propeller is rotationally driven by the motor, and thereby applies vibration to the optical fiber, and the interrogator determines sunshine duration at the installation location of the vibration device, based on a frequency and intensity of vibration applied to the optical fiber.

(Supplementary Note 7)

An optical fiber sensing method to be executed by an optical fiber sensing system, the optical fiber sensing system including:

an optical fiber;

an interrogator connected to the optical fiber: and a vibration device disposed in a vicinity of the optical fiber, the optical fiber sensing method including:

a first step of, by the vibration device, acquiring weather information regarding an installation location of the vibration device and applying vibration according to the acquired weather information to the optical fiber: and a second step of, by the interrogator, detecting vibration applied to the optical fiber by the vibration device, based on an optical signal received from the optical fiber, and determining weather conditions at the installation location of the vibration device, based on the detected vibration.

(Supplementary Note 8)

The optical fiber sensing method according to supplementary note 7, wherein, in the second step, the interrogator determines weather conditions at the installation location of the vibration device, based on at least one of a frequency and intensity of vibration applied to the optical fiber.

(Supplementary Note 9)

The optical fiber sensing method according to supplementary note 8, wherein the vibration device operates in a state in which there is no power supply from outside to the vibration device.

(Supplementary Note 10)

The optical fiber sensing method according to supplementary note 9, wherein the vibration device is a propeller, in the first step, a blade portion of the propeller rotates when being hit by wind, hits the optical fiber, and thereby applies vibration to the optical fiber, and, in the second step, the interrogator determines wind force at the installation location of the vibration device, based on a frequency of vibration applied to the optical fiber.

(Supplementary Note 11)

The optical fiber sensing method according to supplementary note 9, wherein the vibration device is a shishi-odoshi including a cylindrical member configured to have an opening at one end and receive rainwater through the opening, and a support member configured to rotatably support the cylindrical member, in the first step, the cylindrical member rotates due to an own weight when rainwater stored in the cylindrical member reaches a predetermined amount, hits the optical fiber, and thereby applies vibration to the optical fiber, and, in the second step, the interrogator determines a rainfall amount at the installation location of the vibration device, based on a frequency of vibration applied to the optical fiber.

(Supplementary Note 12)

The optical fiber sensing method according to supplementary note 9, wherein the vibration device includes a solar panel configured to generate electric power by using sunlight, a storage battery configured to store electric power generated by the solar panel, a propeller, and a motor configured to rotationally drive the propeller by using electric power stored in the storage battery, in the first step, a blade portion of the propeller hits the optical fiber when the propeller is rotationally driven by the motor, and thereby applies vibration to the optical fiber, and, in the second step, the interrogator determines sunshine duration at the installation location of the vibration device, based on a frequency and intensity of vibration applied to the optical fiber.

(Supplementary Note 13)

A vibration device disposed in a vicinity of an optical fiber, the vibration device configured to perform:

acquiring weather information regarding an installation location of the vibration device: and applying vibration according to the weather information to the optical fiber.

(Supplementary Note 14)

The vibration device according to supplementary note 13, wherein the vibration device operates in a state in which there is no power supply from outside to the vibration device.

(Supplementary Note 15)

The vibration device according to supplementary note 14, wherein the vibration device is a propeller, and a blade portion of the propeller rotates when being hit by wind, hits the optical fiber, and thereby applies vibration to the optical fiber.

(Supplementary Note 16)

The vibration device according to supplementary note 14, wherein the vibration device is a shishi-odoshi including a cylindrical member configured to have an opening at one end and receive rainwater through the opening, and a support member configured to rotatably support the cylindrical member, and the cylindrical member rotates due to an own weight when rainwater stored in the cylindrical member reaches a predetermined amount, hits the optical fiber, and thereby applies vibration to the optical fiber.

(Supplementary Note 17)

The vibration device according to supplementary note 14, wherein the vibration device includes a solar panel configured to generate electric power by using sunlight, a storage battery configured to store electric power generated by the solar panel, a propeller, and a motor configured to rotationally drive the propeller by using electric power stored in the storage battery, and a blade portion of the propeller hits the optical fiber when the propeller is rotationally driven by the motor, and thereby applies vibration to the optical fiber.

What is claimed is:

1. An optical fiber sensing system comprising:

an optical fiber;

an interrogator connected to the optical fiber; and a vibration device disposed in a vicinity of the optical fiber, wherein the vibration device acquires weather information regarding an installation location of the vibration device, and applies vibration according to the acquired weather information to the optical fiber, and the interrogator detects vibration applied to the optical fiber by the vibration device, based on an optical signal received from the optical fiber, and determines weather conditions at the installation location of the vibration device, based on the detected vibration.

2. The optical fiber sensing system according to claim 1, wherein the interrogator determines weather conditions at the installation location of the vibration device, based on at least one of a frequency and intensity of vibration applied to the optical fiber.

3. The optical fiber sensing system according to claim 2, wherein the vibration device operates in a state in which there is no power supply from outside to the vibration device.

4. The optical fiber sensing system according to claim 3, wherein the vibration device is a propeller, a blade portion of the propeller rotates when being hit by wind, hits the optical fiber, and thereby applies vibration to the optical fiber, and the interrogator determines wind force at the installation location of the vibration device, based on a frequency of vibration applied to the optical fiber.

5. The optical fiber sensing system according to claim 3, wherein the vibration device is a shishi-odoshi including a cylindrical member configured to have an opening at one end and receive rainwater through the opening, and a support member configured to rotatably support the cylindrical member, the cylindrical member rotates due to an own weight when rainwater stored in the cylindrical member reaches a predetermined amount, hits the optical fiber, and thereby applies vibration to the optical fiber, and the interrogator determines a rainfall amount at the installation location of the vibration device, based on a frequency of vibration applied to the optical fiber.

6. The optical fiber sensing system according to claim 3, wherein the vibration device includes a solar panel configured to generate electric power by using sunlight, a storage battery configured to store electric power generated by the solar panel, a propeller, and a motor configured to rotationally drive the propeller by using electric power stored in the storage battery, a blade portion of the propeller hits the optical fiber when the propeller is rotationally driven by the motor, and thereby applies vibration to the optical fiber, and the interrogator determines sunshine duration at the installation location of the vibration device, based on a frequency and intensity of vibration applied to the optical fiber.

7. An optical fiber sensing method to be executed by an optical fiber sensing system, the optical fiber sensing system including:

an optical fiber;

an interrogator connected to the optical fiber; and a vibration device disposed in a vicinity of the optical fiber, the optical fiber sensing method comprising:

a first step of, by the vibration device, acquiring weather information regarding an installation location of the vibration device and applying vibration according to the acquired weather information to the optical fiber; and a second step of, by the interrogator, detecting vibration applied to the optical fiber by the vibration device, based on an optical signal received from the optical fiber, and determining weather conditions at the installation location of the vibration device, based on the detected vibration.

8. The optical fiber sensing method according to claim 7, wherein, in the second step, the interrogator determines weather conditions at the installation location of the vibration device, based on at least one of a frequency and intensity of vibration applied to the optical fiber.

9. The optical fiber sensing method according to claim 8, wherein the vibration device operates in a state in which there is no power supply from outside to the vibration device.

10. The optical fiber sensing method according to claim 9, wherein the vibration device is a propeller, in the first step, a blade portion of the propeller rotates when being hit by wind, hits the optical fiber, and thereby applies vibration to the optical fiber, and, in the second step, the interrogator determines wind force at the installation location of the vibration device, based on a frequency of vibration applied to the optical fiber.

11. The optical fiber sensing method according to claim 9, wherein the vibration device is a shishi-odoshi including a cylindrical member configured to have an opening at one end and receive rainwater through the opening, and a support member configured to rotatably support the cylindrical member, in the first step, the cylindrical member rotates due to an own weight when rainwater stored in the cylindrical member reaches a predetermined amount, hits the optical fiber, and thereby applies vibration to the optical fiber, and, in the second step, the interrogator determines a rainfall amount at the installation location of the vibration device, based on a frequency of vibration applied to the optical fiber.

12. The optical fiber sensing method according to claim 9, wherein the vibration device includes a solar panel configured to generate electric power by using sunlight, a storage battery configured to store electric power generated by the solar panel, a propeller, and a motor configured to rotationally drive the propeller by using electric power stored in the storage battery, in the first step, a blade portion of the propeller hits the optical fiber when the propeller is rotationally driven by the motor, and thereby applies vibration to the optical fiber, and, in the second step, the interrogator determines sunshine duration at the installation location of the vibration device, based on a frequency and intensity of vibration applied to the optical fiber.

13. A vibration device disposed in a vicinity of an optical fiber, the vibration device configured to perform:

acquiring weather conditions information regarding an installation location of the vibration device; and applying vibration according to the weather information to the optical fiber.

14. The vibration device according to claim 13, wherein the vibration device operates in a state in which there is no power supply from outside to the vibration device.

15. The vibration device according to claim 14, wherein the vibration device is a propeller, and a blade portion of the propeller rotates when being hit by wind, hits the optical fiber, and thereby applies vibration to the optical fiber.

* * * * *